Aug. 1, 1939.  C. LEFFLER ET AL  2,167,923
MACHINE FOR DESTROYING GRASSHOPPERS OR THE LIKE
Filed Aug. 19, 1937  4 Sheets-Sheet 1
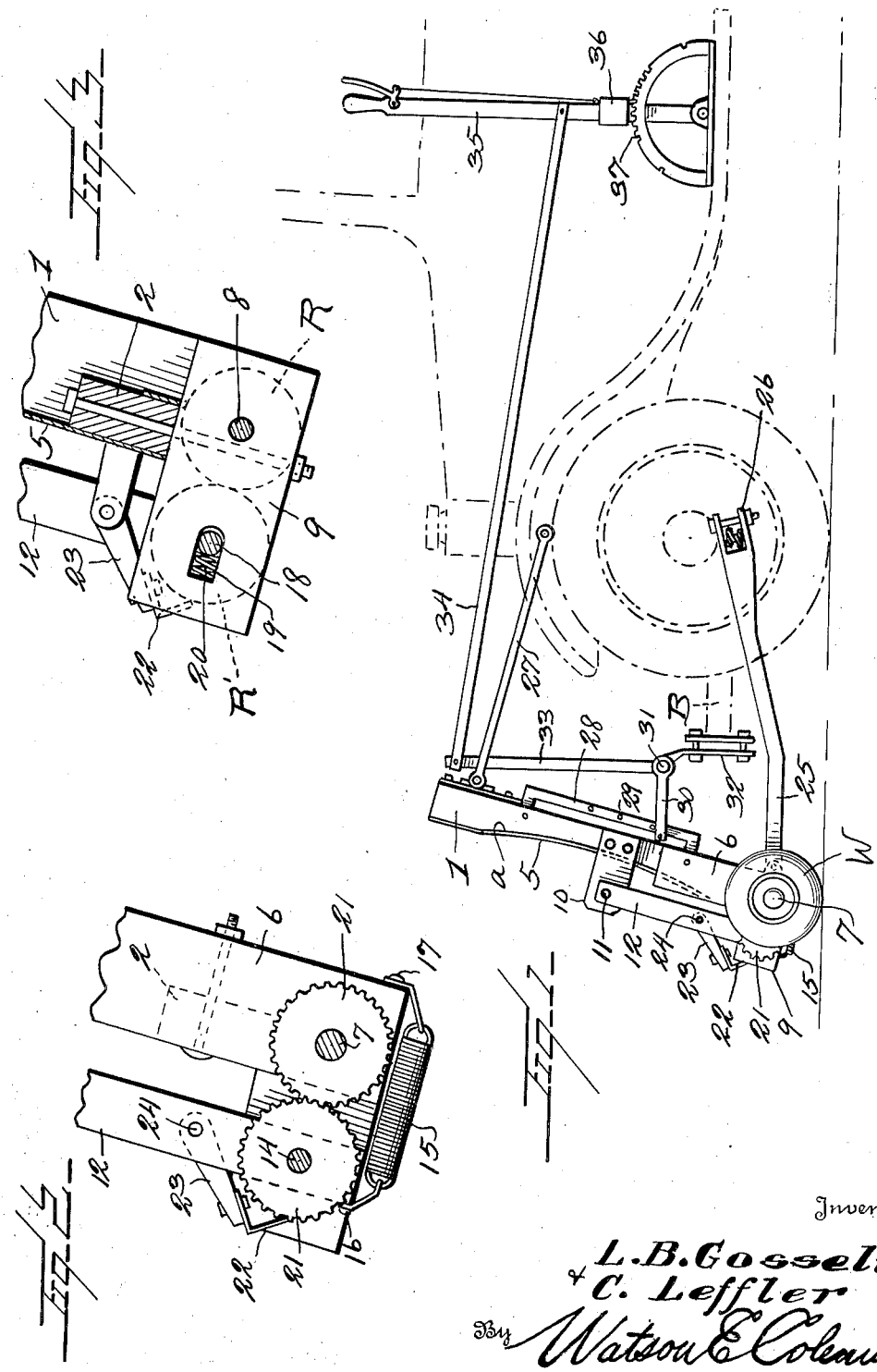
Inventors
L. B. Gosselin
& C. Leffler
By Watson E. Coleman
Attorney

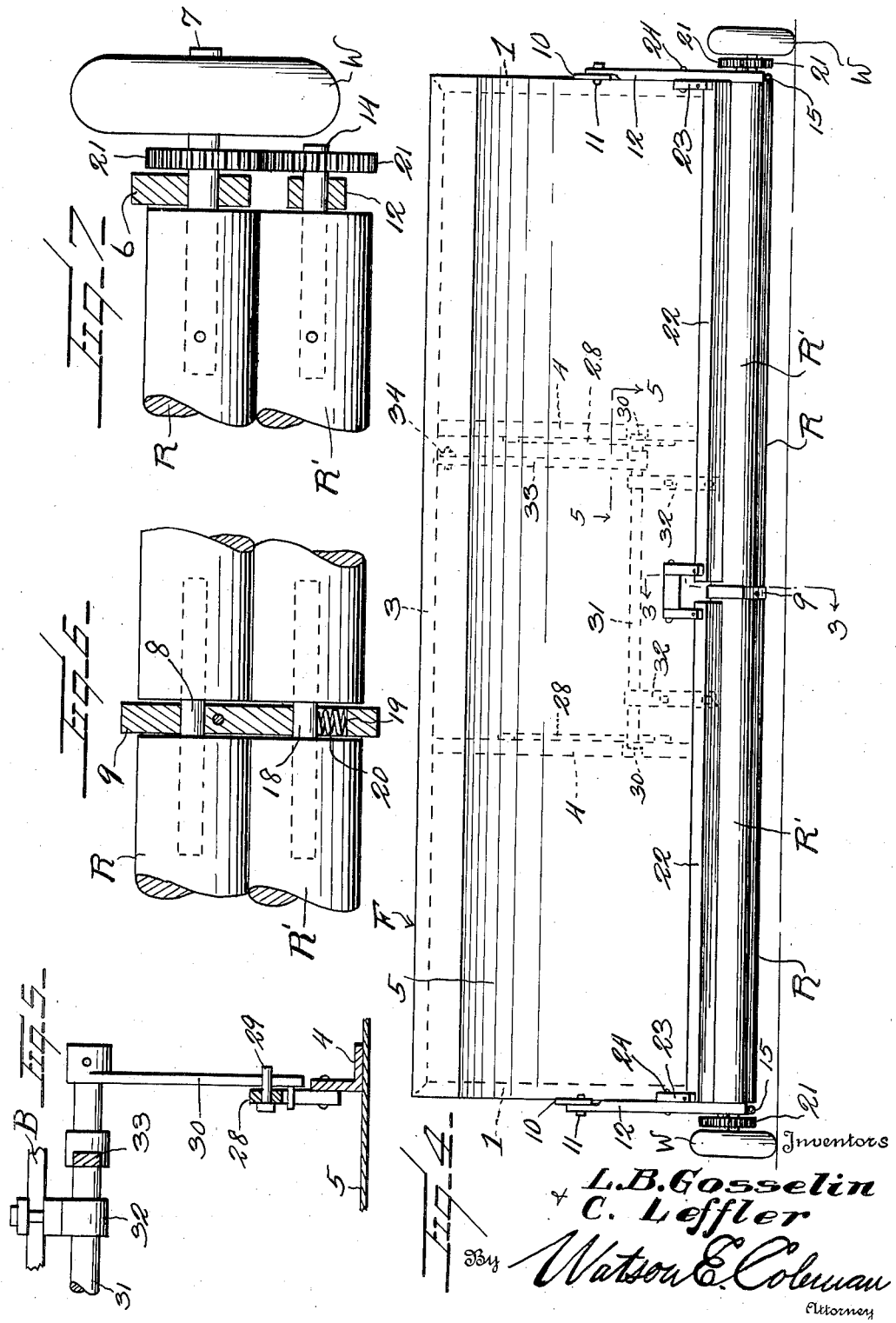

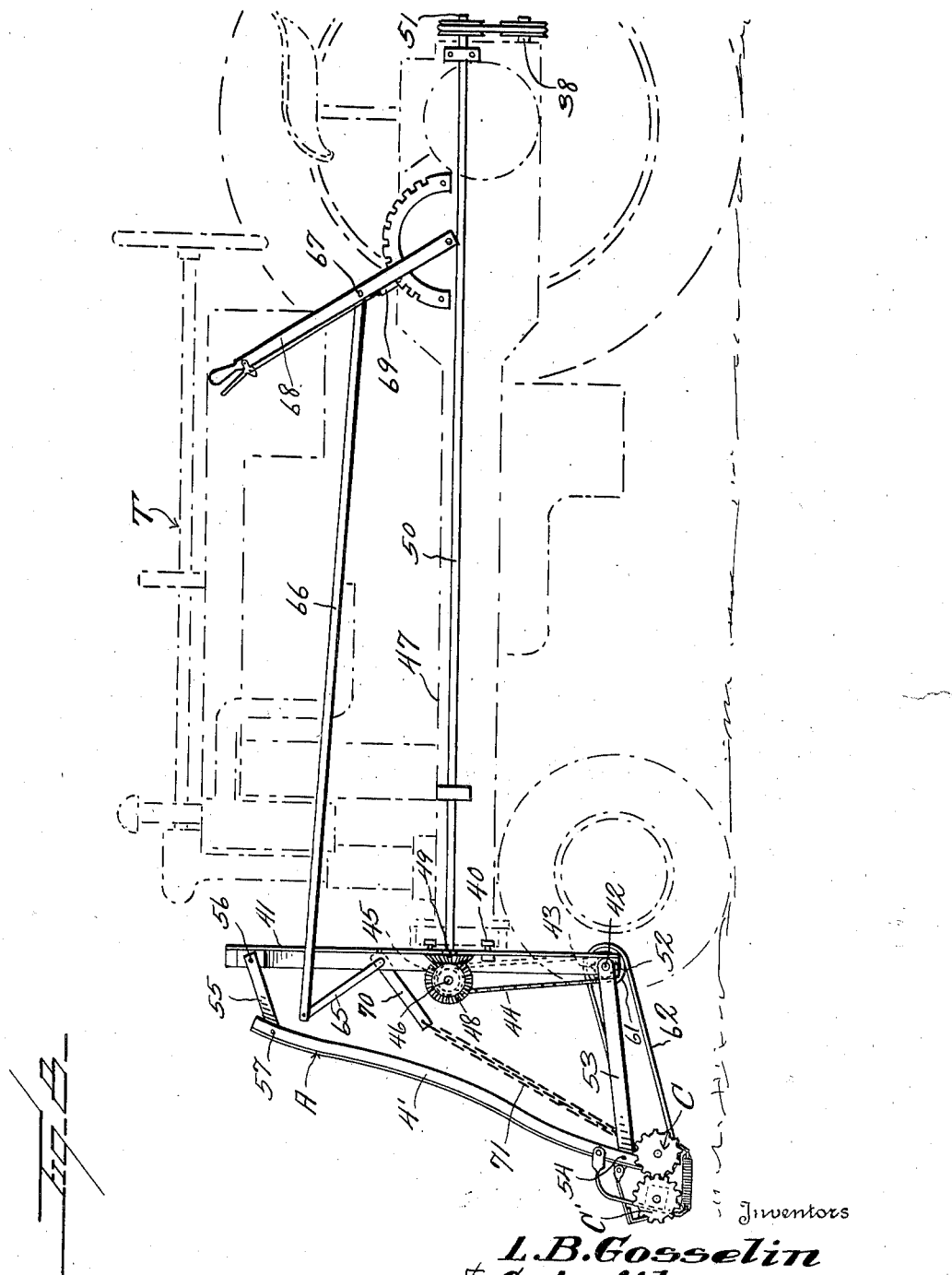

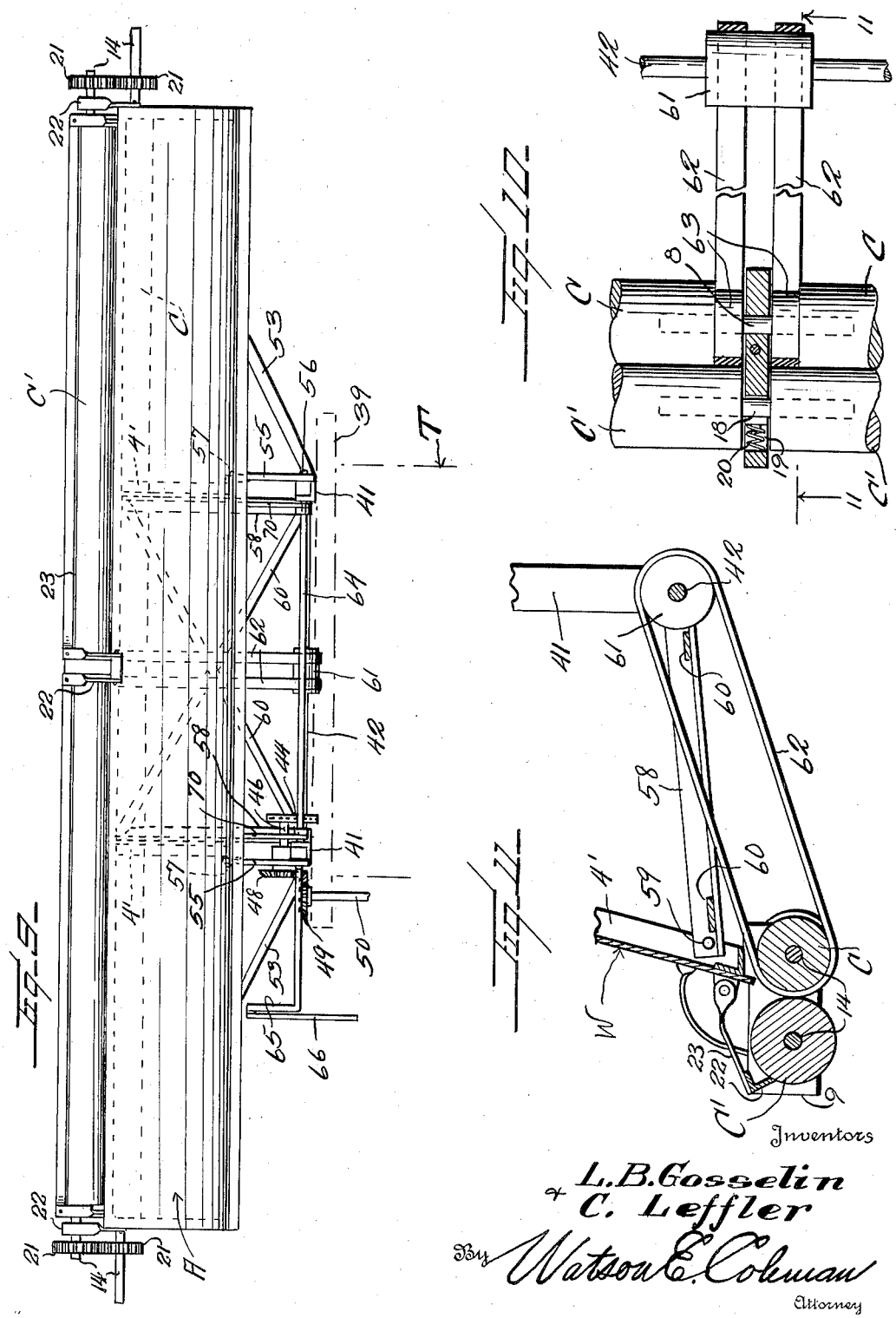

Patented Aug. 1, 1939

2,167,923

UNITED STATES PATENT OFFICE 2,167,923

MACHINE FOR DESTROYING GRASSHOPPERS OR THE LIKE

Carl Leffler and Leslie B. Gosselin,
Greeley, Colo.

Application August 19, 1937, Serial No. 159,966

3 Claims. (Cl. 43—138)

This invention relates to machines for destroying insects and has relation more particularly to a machine of this kind especially designed and adapted for use in the extermination of grasshoppers.

It is an object of the invention to provide a machine of this kind providing means for crushing the insects together with means to cause the insects to be brought into required engagement with the crushing medium.

Another object of the invention is to provide a machine of this kind which comprises an upstanding portable wall having its lower marginal portion closely approaching the surface over which the wall may traverse, said wall providing an abutment against which insects jump as the machine advances, said wall serving to deflect the insects toward a crushing medium.

Furthermore, it is an object of the invention to provide a machine constructed and assembled in a manner to provide an effective medium for exterminating insects, such as grasshoppers, without the use of poison.

The invention consists in the details of construction and in the combination and arrangement of the several parts of our improved machine for destroying insects whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in side elevation of a machine for destroying grasshoppers constructed in accordance with an embodiment of our invention, a coacting motor vehicle being fragmentarily indicated by broken lines;

Figure 2 is a fragmentary view partly in section and partly in elevation illustrating in detail certain of the features in connection with the crushing rollers;

Figure 3 is a fragmentary sectional view taken on the line 3—3 of Figure 4 looking in the direction of the arrow;

Figure 4 is a view in front elevation of the machine illustrated in Figure 1;

Figure 5 is a fragmentary view partly in section and partly in top plan illustrating in detail certain of the features for raising the machine;

Figure 6 is a fragmentary view partly in top plan and partly in horizontal section showing the mounting for the inner extremities of the crushing rollers;

Figure 7 is an enlarged sectional view partly in top plan illustrating the mounting for the outer ends of the crushing rollers;

Figure 8 is a view in side elevation illustrating a machine constructed in accordance with another embodiment of our invention, the ground engaging wheels being omitted and an associated tractor being diagrammatically indicated by broken lines;

Figure 9 is a view in top plan of the improved machine as illustrated in Figure 8, the associated tractor being also fragmentarily indicated by broken lines;

Figure 10 is an enlarged fragmentary view partly in top plan and partly in section illustrating a portion of the means as herein embodied for driving the crushing rollers;

Figure 11 is a detailed sectional view taken substantially on the line 11—11 of Figure 10.

As disclosed in Figures 1 to 7 of the drawings, our improved apparatus comprising a frame F of desired dimensions and preferably about thirty-six inches high and about ten feet long. This framework F is preferably formed of angle iron and comprises vertically disposed end members 1 having their extremities welded or otherwise securely attached to the extremities of the bottom member 2 and the top member 3. The members 2 and 3 are also connected by the intermediate reinforcing members 4, the same being equidistantly disposed at opposite sides of the longitudinal center of the frame F.

Disposed over the frame F is a sheet or plate 5 preferably of galvanized iron and of twenty-eight gauge. The marginal portions of this sheet or plate 5 overlie the members 1, 2 and 3 of the frame F and welded or otherwise rigidly secured thereto. It is also preferred that the intermediate portions of the end members 1 be disposed on an inward curvature, as indicated at a, so that the plate or sheet 5 will have a similar formation.

Secured to the lower portions of the end members 1 of the frame F are the bearing strips 6 each extending a distance below the lower member 2 and providing a mounting for an outstanding stub shaft 7 extending axially from a roller R. Each of these stub shafts 7 has mounted thereon a ground engaging wheel W which may be of any size desired and which preferably is of a pneumatic type.

As disclosed in the accompanying drawings, we employ two rollers R which, when in assembly, are in alignment one with the other and the inner end portions of the rollers R engage the opposite end portions of a shaft 8 which is disposed through and rotatably supported by a bearing 9 depending from the central portion of the lower member 2 of the frame F. It is to be stated that the inner or opposed ends of the assembled rollers R are spaced but a slight distance apart so that for all intents and purposes the rollers R are one in continuity of the other.

Extending forwardly from the end members 1 of the frame F are the plates 10 with each of which is pivotally connected, as at 11, the upper portion of a swinging bearing arm 12. The lower end portion of the arm 12 rotatably supports a stub axle 14 carried by the outer end portion of a roller R' for coaction with one of the rollers R. The arm 12 is constantly urged inwardly toward the frame F through the medium of a retractile spring 15 of required tension having one end portion anchored, as at 16, to the lower portion of the arm 12 and with its opposite end portion securely fastened, as at 17, to the lower portion of the bearing strip 6.

The inner extremities of the rollers R' engage a short shaft or axle 18 which is disposed through a slot 19 provided in the forward portion of the bearing 9. Within this slot 19 for coaction with the shaft or axle 18 is an expansible member or spring 20. The stub axles 7 of the rollers R and the stub axles 14 of the rollers R' carry the meshing gears 21 which rotate with the rollers R and R'. By the provision of these gears the desired rotation of the rollers R and R' is assured and in a manner to effect the desired crushing action upon the grasshoppers or kindred insects which are dropped down upon the rollers R and R'.

In practice, our machine is adapted to be pushed over a surface infested with grasshoppers or the like with the wall, as afforded by the frame F and its associated plate or sheet 5 in substantially a vertical position. As the machine advances, the grasshoppers will jump up against the plate or sheet 5 and thus drop down upon the rollers R and R' and be carried downwardly therebetween and crushed. By this means the grasshoppers are effectively exterminated and without the use of poison. As the insects pass down between the rollers R and R' there is a tendency for the same to stick to such rollers and particularly the rollers R'. We, therefore, provide a scraping blade 22 of a length substantially co-extensive to the combined lengths of the rollers R' and mounted for yielding contact with the periphery of the rollers R' to scrape off such grasshoppers or the like which may be sticking to the rollers. As herein disclosed, each end portion of this blade 22 is suitably secured to a rock arm 23 in pivotal connection, as at 24, with a swinging bearing arm 12.

Suitably attached to the lower portion of each of the intermediate members 4 of the frame F is a push bar 25 of desired length and configuration and which is adapted to be coupled, as at 26, to the front axle of a truck or kindred motor driven vehicle. The upper portions of these members 4 also each has operatively connected therewith an end portion of a brace member 27 adapted for suitable connection to the forward portion of the vehicle whereby the machine is maintained in desired position in advance of the motor vehicle.

When coming to a turn it is of advantage to raise the apparatus out of contact with the ground or other surface and to accomplish this the members 4 of the frame F carry the rearwardly directed brackets 28 carrying the inwardly disposed members 29 which are adapted to be engaged from below by the vertically swinging rock arms 30. These rock arms 30 extend forwardly from a shaft 31 which is rotatably held by the bearings 32 clamped or otherwise affixed to the bumper B of the motor driven vehicle. Extending upwardly from this shaft 31 is a lever 33 which is operatively connected by a rod 34 to an upstanding hand lever 35 mounted upon the running board of the motor driven vehicle. This hand lever is of a conventional type and carries the latch mechanism 36 for coacting with a rack 37 so that the insect destroying machine may be readily maintained in raised position and at the same time conveniently lowered to working position when desired.

In the embodiment of our invention as illustrated in Figures 8 to 11 a machine is disclosed which is particularly designed and adapted for use in connection with a tractor T including a power take-off shaft 38. The front or forward end of the tractor T carries a transversely disposed member or bumper 39 indicated by broken lines in Figures 8 and 9, to which are bolted, as at 40, the vertically disposed posts 41. These posts 41 are preferably angle irons and when in applied position extend a desired distance above and below the member or bumper 39 and, of course, said posts 41 are spaced apart a desired distance.

The lower portions of these posts 41 rotatably support the shaft 42 which, as herein disclosed, is provided adjacent to one of the posts 41 with a sprocket wheel 43 which is in driven connection by a sprocket chain 44 with a sprocket 45 mounted upon a stub shaft 46 rotatably supported by the posts 41 preferably in advance of the chassis 47 of the tractor. This stub shaft 46 also carries, as herein disclosed, a beveled gear 48 meshing with a beveled pinion 49 carried by the forward end portion of a shaft 50. This shaft 50 extends along a side of the chassis 47 of the tractor and is rotatably supported thereby, and the rear portion of this shaft 50 is in driven connection, as at 51, with the take-off shaft 38. Freely mounted upon the end portions of the shaft 42 are the angular extremities 52 of the brace members 53, the opposite end portion of each of which is pivotally connected, as at 54, with an intermediate vertically disposed reinforcing member 4' comprised in the wall structure A. This wall structure A is constructed in substantially the same manner as the vertical wall described in detail in connection with the first embodiment of the invention.

These brace members 53 permit vertical adjustment of the wall A and said wall A is maintained in its substantially vertical position by the upper rigid links 55. Each of these links 55 is of desired length and one end portion of each of such links is pivotally connected, as at 56, with the upper portion of a post 41 while the opposite end portion is pivotally connected, as at 57, with the upper end portion of a reinforcing member 4'.

Freely engaged with the shaft 42 are the inner end portions of the forwardly disposed arms 58. These arms 58 extend forward and each has its outer end portion pivotally connected, as at 59, with the lower portion of a reinforcing member 4'. The pivotal connection 59 for a brace member 53 is also a pivotal connection for the adjacent arm 58. These arms 58 preferably constitute angle irons and are rigidly connected for unitary movement in the same direction and maintained substantially in parallelism by the interposed cross brace members 60.

Associated with the lower marginal portion of the wall A are the crushing rollers C and C' mounted and assembled in substantially the same manner as the rollers R and R' respectively as comprised in the first embodiment of our invention. In this embodiment of our invention it is not necessary that the ground engaging wheels be employed as the rollers in this form of invention are driven from the shaft 42.

The shaft 42 at the central part thereof carries a pulley 61 around which passes the belts 62. In the present embodiment of our invention these belts 62 pass around the reduced inner end portions 63 of the rollers C and C', said reduced portions 63 constituting integral pulleys. It is believed to be clear, in view of the foregoing, that the rollers C and C' in this form of our invention are positively caused to rotate by the power derived from the take-off shaft 38.

The posts 41 also rotatably support a shaft 64, one end portion of which carrying an upstanding rock arm 65. This rock arm 65 has operatively engaged therewith a rod 66 which extends rearwardly of the tractor T at one side thereof and is also operatively engaged, as at 67, with an upstanding hand lever 68. This hand lever 68 is also of a conventional type and has associated therewith a latch mechanism 69 whereby the lever 68 may be selectively locked in its various adjustments.

The shaft 64 also carries a second rock arm 70 which extends forwardly and downwardly toward the wall structure A, and the outer end portion of this arm 70 and the lower portion of the wall structure A are connected by a flexible member 71, preferably a chain, so that upon proper manipulation of the lever 68 the wall structure A may be readily raised and, furthermore, permitting the structure A to be held in desired different vertical adjustments.

From the foregoing description it is thought to be obvious that a machine for destroying insects constructed in accordance with our invention is particularly well adapted for use by reason of the convenience and facility with which it may be assembled and operated, and it will also be obvious that our invention is susceptible of some changes and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A machine for destroying grasshoppers or the like comprising a wall structure, means for connecting said wall structure in advance of a motor vehicle, said connecting means holding said wall structure in a substantially vertical position, with the lower marginal portion of the wall structure in close proximity to the surface over which the machine traverses swinging arms operatively supported by the end portions of the wall structure in advance thereof, a central bearing member carried by the lower portion of the wall structure, end bearing members carried by the wall structure, crushing rollers rotatably supported by the end bearing members and the central bearing member, additional crushing rollers for coaction with the first named crushing rollers rotatably supported by the swinging arms and also by the central bearing member, said central bearing member permitting the adjacent end portions of the second named rollers to have movement relative to the first crushing rollers.

2. A machine for destroying grasshoppers or the like for use in connection with a portable body comprising posts, means for securing the posts to the front end portion of the vehicle with the posts vertically disposed and spaced apart in a direction transverse to the direction of travel of the vehicle, a driven shaft rotatably supported by the lower portions of the posts, a wall structure in advance of the posts, said wall structure being of a length to extend across the forward end of the vehicle, links pivotally connecting the upper end portions of the posts and the upper portion of the wall structure, brace members pivotally connected with the extremities of the driven shaft and with the lower portions of the posts whereby the wall structure is supported for up and down movement, means for raising and lowering the wall structure, crushing rollers carried by the lower portion of the wall structure, and a driving connection between the crushing rollers and the driven shaft.

3. A machine for destroying grasshoppers or the like for use in connection with a portable body comprising posts, means for securing the posts to the front end portion of the vehicle with the posts vertically disposed and spaced apart in a direction transverse to the direction of travel of the vehicle, a driven shaft rotatably supported by the lower portions of the posts, a wall structure in advance of the posts, said wall structure being of a length to extend across the forward end of the vehicle, links pivotally connecting the upper end portions of the posts and the upper portion of the wall structure, brace members pivotally connected with the extremities of the driven shaft and with the lower portions of the posts whereby the wall structure is supported for up and down movement, means for raising and lowering the wall structure, crushing rollers carried by the lower portion of the wall structure, a driving connection between the crushing rollers and the driven shaft, one of said crushing rollers being supported by the wall structure for swinging movement toward or from the second crushing roller, and means for constantly urging said first crushing roller toward the second roller.

CARL LEFFLER.
LESLIE B. GOSSELIN.